Sept. 14, 1943.　　　B. A. DUFFY　　　2,329,398
SCREW DRIVER
Filed Jan. 23, 1941

INVENTOR
Bernard A. Duffy
by
ATTORNEY

Patented Sept. 14, 1943

2,329,398

UNITED STATES PATENT OFFICE 2,329,398

SCREW DRIVER

Bernard A. Duffy, Albany, N. Y.

Application January 23, 1941, Serial No. 375,662

1 Claim. (Cl. 145—50)

My invention relates to screw drivers and particularly to screw drivers adapted for use by surgeons for the insertion of screws into broken bones. Where the screw must be passed through a considerable thickness of tissue obvious difficulties are presented in properly starting the screw and maintaining the screw driver in proper operative relation to the screw until it is driven home. In such screw drivers the shank should be as small as possible and must be free of all external projections which possibly might tear or otherwise injure the tissue. Furthermore, such a screw driver must be of such construction that the parts thereof can be readily sterilized.

The principal objects of my invention therefore are to provide an improved type of screw driver provided with means whereby a screw may be easily and positively secured to the end of the blade and readily detached therefrom after the screw has been driven home. Another object is to provide a screw driver of this type having its exterior substantially free from germ collecting recesses and openings and which may be readily disassembled so that all parts thereof may be perfectly sterilized.

With these objects in view my invention includes the novel elements and combinations and arrangements thereof described below and illustrated in the accompanying drawing in which—

Figure 1:
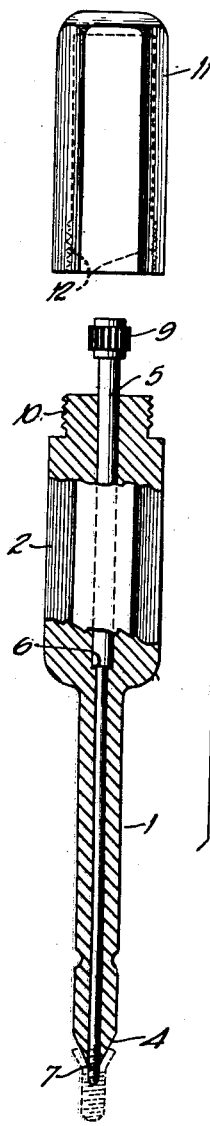
Fig 1 is an elevation view, partially in section, of my screw driver.
Figure 3:
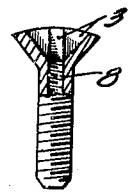
Fig. 3 is an elevation view, partially in section, of a screw adapted to be used with my screw driver.
Figure 4:
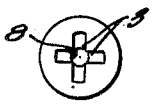
Fig. 4 is a plan view of the head of the screw.
Figure 5:
Fig. 5 is a fragmentary perspective view of the end of the screw driver shank showing a screw secured thereto.

Referring to the drawing, and particularly to Fig. 1, my screw driver comprises a shank 1 and an enlarged handle portion 2 which are preferably integral and formed of stainless steel or other alloy which is highly resistant to corrosion. The screws which are preferably employed for surgical work are the Phillips type, shown in Figs. 3 and 4, having cross or star-shaped recesses 3 in the head instead of a slot. For this reason the end of the shank or blade 4 of the screw driver which engages the screw is made cruciform to fit within this recess, as shown in Fig. 4. The screw driver is provided with a longitudinal bore adapted to receive an inner shaft or spindle 5 which is reduced in size at some point intermediate its length to provide a shoulder 6 which limits the extent to which the spindle projects from the blade end of the screw driver. The portion of the spindle which projects from the blade end of the screw driver is threaded, as shown at 7, to engage a threaded recess 8 in the screw. The portion of the inner shaft or spindle which projects beyond the handle end of the screw driver is provided with a knob 9 adapted to be grasped by the fingers for turning the spindle and threading it into and out of the screw. The upper end of the handle just below the knob 9 is reduced in size and threaded as shown at 10 to receive a cover 11 which is interiorly threaded at 12. The cover 11 protects the knob 9 when the screw driver is being used so that the connection between the screw and spindle 5 cannot be accidentally loosened. However, by removing the cap or cover 11, the spindle 5 may be withdrawn from the shank so that all the exterior and interior surfaces of the screw driver may be readily sterilized.

Figure 2:
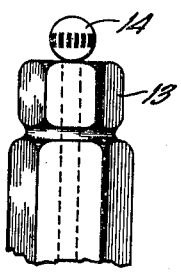
Fig. 2 is a fragmentary elevation view showing a modification.

In Fig. 2 I have illustrated a slightly modified type of driver especially adapted for use with a wrench. In this species, the upper end of the handle is preferably made in reduced hexagonal size, as shown at 13, to receive the wrench and I have here shown a spherical manipulating knob 14 at the end of the spindle.

In operation, the screw is first placed against the blade with the portions of the blade positioned in the slots in the head of the screw. By using screws of the Phillips type this step automatically aligns the threaded opening in the head of the screw with the threaded end of the spindle so that by manipulating the other end of the spindle the screw is quickly and positively secured to the blade. After the screw has been driven home the screw driver may be readily disengaged from the screw by manipulating the knob 9 or 14 in the reverse direction. To surgeons who know the difficulties in handling instruments, and particularly small articles, with wet rubber gloves, the superior advantages of my screw driver are at once apparent.

What I claim is:

A surgical screw driver comprising a handle, a shank extending from said handle and terminating in a cruciform screw-engaging blade adapted to engage a cruciform recess in the head of a screw; said screw driver being provided with an axial passage extending therethrough from end to end; a spindle rotatively mounted in said passage and projecting from each end of said screw driver; said spindle being externally threaded at the end thereof projecting from said blade and adapted to cooperate with a threaded axial passage in said screw; and means for limiting the forward axial extension of said spindle; whereby the threaded passage in said screw and the threaded end of said spindle may be quickly and positively positioned in precise cooperative, coaxial alignment by merely engaging said blade with said recess, and said screw may, thereafter, be firmly secured to said blade in driving position by merely turning the end of said spindle projecting from said handle to bring the threaded end of said spindle into cooperation with the threaded recess in said screw.

BERNARD A. DUFFY.